United States Patent
Kimizuka

(10) Patent No.: US 6,883,397 B2
(45) Date of Patent: Apr. 26, 2005

(54) GEAR MADE OF RESIN, AND MOLD STRUCTURE

(75) Inventor: Genichi Kimizuka, Kawaguchi (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 09/899,608

(22) Filed: Jul. 5, 2001

(65) Prior Publication Data

US 2002/0014133 A1 Feb. 7, 2002

(30) Foreign Application Priority Data

Jul. 6, 2000 (JP) ........................................ 2000-204597

(51) Int. Cl.[7] ............................................. F16H 55/06
(52) U.S. Cl. ....................... 74/462; 74/DIG. 10; 74/460
(58) Field of Search ........................ 74/437, 460, 461, 74/462, DIG. 10, 468, 467, 443, 445; 474/149, 152, 153, 161, 156, 202

(56) References Cited

U.S. PATENT DOCUMENTS

| | | | | | |
|---|---|---|---|---|---|
| 2,862,400 A | * | 12/1958 | D'Angelo | ..................... | 74/460 |
| 3,602,058 A | * | 8/1971 | Beddoe | ..................... | 74/461 |
| 4,473,364 A | * | 9/1984 | Roling | ..................... | 474/152 |
| 5,400,672 A | * | 3/1995 | Bunch, Jr. | ..................... | 74/443 |
| 5,852,951 A | * | 12/1998 | Santi | ..................... | 74/DIG. 10 |
| 6,000,295 A | * | 12/1999 | Kimizuka | ..................... | 74/DIG. 10 |
| 6,070,484 A | * | 6/2000 | Sakamaki | ..................... | 74/DIG. 10 |
| 6,181,899 B1 | * | 1/2001 | Fukuchi | ..................... | 74/DIG. 10 |

FOREIGN PATENT DOCUMENTS

| | | | | |
|---|---|---|---|---|
| JP | 58214053 | * | 6/1982 | ................. 474/153 |
| JP | 58203257 | * | 8/1983 | ................. 474/153 |

* cited by examiner

*Primary Examiner*—David A. Bucci
*Assistant Examiner*—Bradley J. Van Pelt
(74) *Attorney, Agent, or Firm*—Koda & Androlia

(57) ABSTRACT

A gear made of a resin includes a substantially cylindrical rim having a plurality of teeth formed around an outer periphery thereof, a boss formed about a rotational center of the rim, and a web connecting the boss and the rim to each other. At least one groove is defined along outer surface of each tooth to divide the tooth in a widthwise direction of the tooth. As a result, a portion of the gear, in which the grooves are defined, is deformed in a reduced amount, leading to a reduced amount of deformation such as a warpage or sink in the entire gear, thereby providing an enhancement in tooth flank accuracy. Since the grooves are defined along the outer surfaces of the teeth, a lubricant such as grease can be supplied effectively to tooth flanks by previously applying the lubricant in the grooves.

3 Claims, 7 Drawing Sheets

PRIOR ART (a) (b)

GEAR MADE OF RESIN, AND MOLD STRUCTURE

BACKGROUND OF THE INVENTION

1. Field of the Invention

The present invention relates to a gear made of a resin, which is used widely in a power-transmitting mechanism for a duplicator, a printer, facsimile, an automobile part.

2. Description of the Related Art

A gear made of a resin is conventionally used in a power-transmitting mechanism for a duplicator, an automobile part and the like for the purpose of reducing the part cost and the weight and the operational sound. The gear made of the resin is formed into a predetermined lightened shape by an injection molding, but the deformation such as a warpage and a sink may occur due to a difference between the amounts of material shrunk at molded portions. For example, as shown in FIGS. 1 to 3, in a gear 1 formed of a resin so that a boss 3 and a rim 5 are connected to each other by a web 4, the amount of shrinkage or contraction of a connection 7 between the rim and the web 4 and the amount of shrinkage of an end of the rim 5 are different from each other and for this reason, there is a possibility that a sink (indicated by a broken line L1) is produced, i.e., the connection 7 between the rim 5 and the web 4 is deformed so that it is recessed. If such a sink is produced, the tooth flank accuracy is degraded. In a gear 1 formed of a resin with a web 4 offset toward one of ends of a rim 5, as shown in FIG. 3, the following disadvantage is encountered: A connection 7 between the web 4 extending radially outwards from an end of the boss 3 and the rim 5 is shrunk in a large amount and as a result, the free end of the rim 5a is deformed, namely, warped (indicated by a broken line L2) to look like being expanded. Particularly, in a gear having a large tooth width as in the prior art shown in FIG. 3, the above disadvantage is significant.

In order to prevent the advantage associated with such gear 1, various gears made of a resin are conventionally proposed, which include ribs extending radially between a boss and a rim 5, or a annular rib, and a web 4 formed at a smaller thickness, while ensuring the strength, so that the deformation such as a warpage and a sink is inhibited by regulating the thickness at each of various portions, thereby enhancing the tooth flank accuracy (for example, see Japanese Patent Application Laid-open No. 9-230657 and the like).

In the conventional gears made of the resin, however, a predetermined tooth flank accuracy is provided, but the demand for an increase in accuracy for the gear made of the resin is considered to be more and more intensified. Therefore, it has been desired in industries for manufacturing a duplicator and an automobile part to provide a gear made of a resin, wherein the deformation such as the warpage and the sink can be inhibited effectively to further enhance the tooth flank accuracy.

SUMMARY OF THE INVENTION

Accordingly, it is an object of the present invention to provide a gear made of a resin meeting the above demand.

To achieve the above object, according to the present invention, there is provided a gear made of a resin, comprising a substantially cylindrical rim having a plurality of teeth formed around an outer periphery thereof, a boss formed about a rotational center of the rim, and a web connecting the boss and the rim to each other, wherein at least one groove is defined along outer surface of each tooth of said teeth to divide said teeth in a widthwise direction of said teeth.

With such configuration, portions of tooth flanks tending to be sunk to a large extent are eliminated by the provision of the grooves and hence, only portions free from a sink and having a tooth flank accuracy can be meshed with a mating gear. In addition, according to the present invention, a thinned portion having the grooves defined therein is deformed in a decreased amount, and hence, the amount of deformation such as a warpage and a sink in an opposite direction is also decreased. Further, according to the present invention, the grooves are defined along the outer surfaces of the teeth and hence, a lubricant such as grease can be supplied effectively to tooth flanks by previously applying the lubricant in the grooves. Thus, the gear made of the resin can be rotated smoothly, and the wearing of the teeth of the gear can be inhibited, thereby enhancing the durability of the gear.

According to the present invention, there is provided a mold structure for forming a molded product which partially includes a sidewall portion having an undercut configuration on one of sides, the other side of the sidewall portion being wall-removed or lightened, wherein the sidewall portion is formed to extend in mold-opening direction, so that a mold-constituting member forming the side face on the lightened side of the sidewall portion is released from the molded product more early than a mold-constituting member on the side having the undercut configuration of the sidewall portion, when the mold is opened.

The above and other objects, features and advantages of the invention will become apparent from the following description of the preferred embodiment taken in conjunction with the accompanying drawings.

DESCRIPTION OF THE PREFERRED EMBODIMENTS

The present invention will now be described by way of embodiments with reference to the accompanying drawings.

I. Gear Made of Resin

Figure 4:
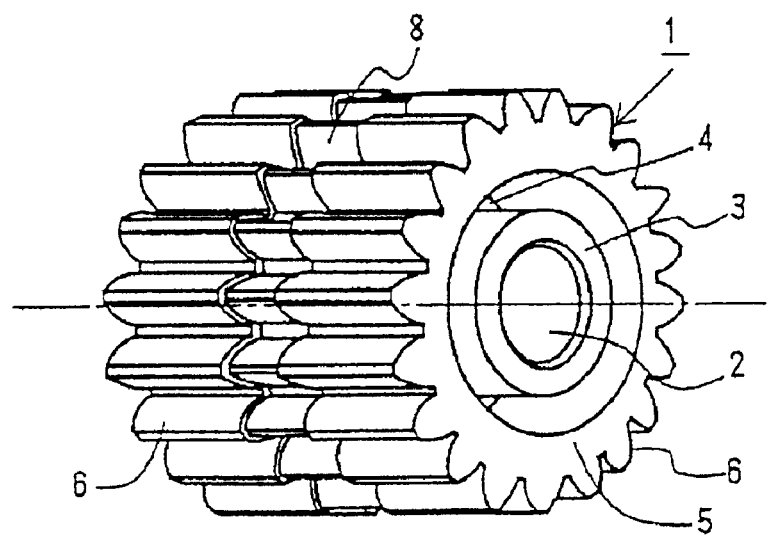
FIG. 4 is a perspective view of a gear made of a resin according to an embodiment of the present invention.
Figure 5:
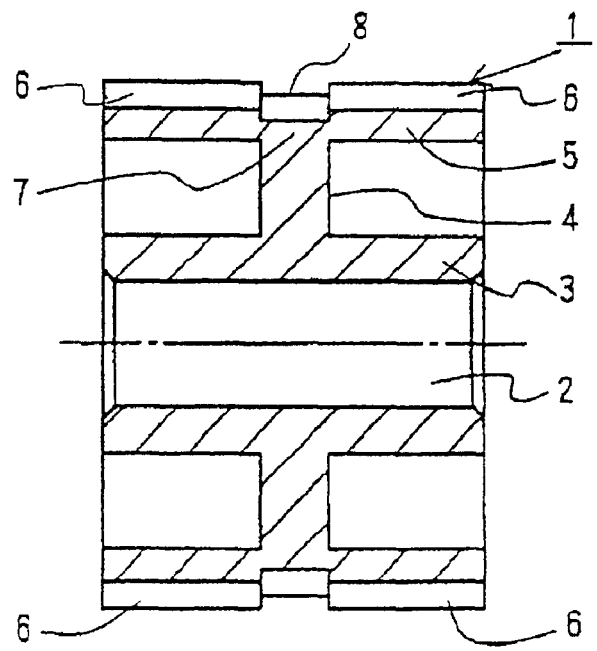
FIG. 5 is a vertical sectional view of the gear made of the resin shown in FIG. 4.
Figure 6:
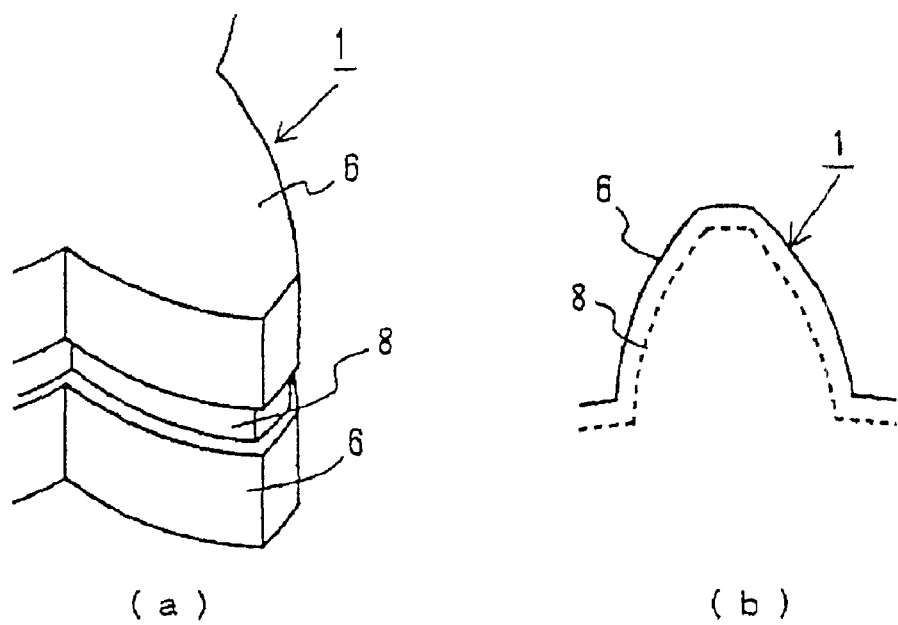
FIG. 6a is an enlarged view of a portion of the gear made of the resin.
FIG. 6b is an enlarged front view of a portion of the gear made of the resin.

FIGS. 4 to 6 show a gear 1 made of a resin according to an embodiment of the present invention. As shown in FIGS. 4 to 6, the gear 1 made of the resin is formed by an injection molding using a resinous material such as polyacetal, polyamide, polyphenylene sulfide, polybutylene terephthalate and the like. The gear 1 includes a boss 3 having a shaft hole 2 defined therein engaged with a shaft, a web formed on an outer surface of the boss 3 at a substantially axially central portion of the boss 3, and a substantially annular rim 5 connected to the boss 3 by the web 4, thereby providing such a shape that the wall between the boss 3 and the rim 5 is removed with the web 4 left. Teeth 6 having a tooth profile matched to the purpose of use are formed around an outer periphery of the rim 5.

Figure 1:
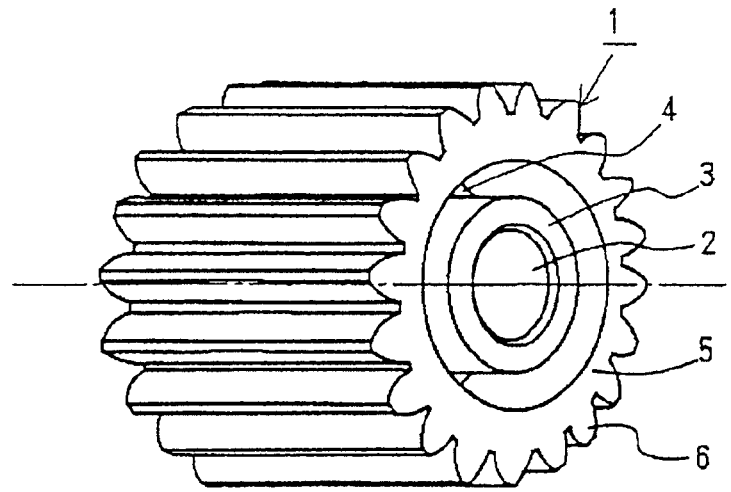
FIG. 1 is a perspective view of a first conventional gear of a resin.
Figure 2:
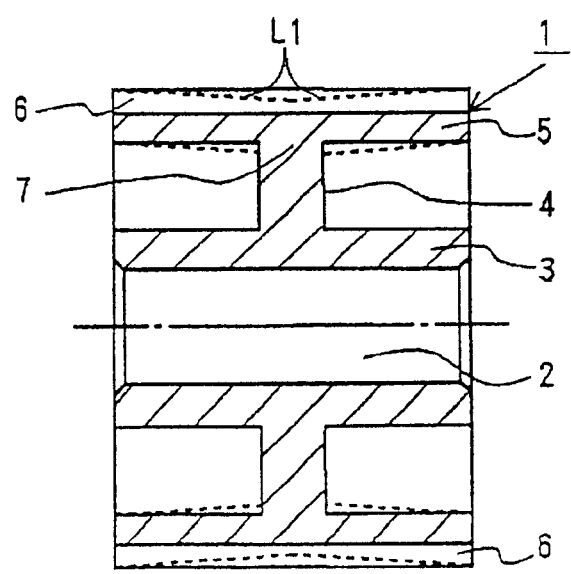
FIG. 2 is a vertical sectional view of the gear shown in FIG. 1.

In a conventional gear shown in FIG. 2, a gear 1 made of a resin including a rim 5 formed at a large thickness to enhance the strength is liable to be shrunk and deformed in a large amount after being injection-molded, as compared with a gear including a thinner rim 5. Particularly, a connection 7 between the web 4 and the rim 5 is liable to be deformed in an increased amount. As a result, the gear is subjected to a deformation called such a sink that the connection 7 between the web 4 and the rim 5 is shrunk or contracted, so that it is recessed, as shown by a broken line in FIG. 2, whereby the outside diameter of the central portion of the rim 5 is smaller than those of the opposite ends of the rim 5. Thus, the accuracy of a tooth flank may be reduced.

In the gear 1 according to the present embodiment, however, groove 8 bisecting each tooth 6 in a widthwise direction is formed along outer peripheral surface of the tooth at substantially widthwise central portion of the tooth (at and in the vicinity of the connection 7 between the web 4 and the rim 5) corresponding to the portion particularly shrunk and deformed in the large amount in the conventional gear shown in FIG. 2. As a result, in the gear 1 according to the present embodiment, the substantially widthwise central portion is formed at a reduced thickness and hence, the amount of widthwise central portion shrink can be decreased, and the sink of the rim 5 can be reduced, thereby enhancing the accuracy of the tooth flank.

The gear 1 made of the resin according to the present embodiment is of a structure made as if a portion having a poor tooth flank accuracy were removed by forming the groove 8. This also can enhance the tooth flank accuracy (particularly, the meshing accuracy).

In the gear 1 made of the resin according to the present embodiment, the groove 8 is defined to extend around the entire periphery of the rim 5 along the outer surface of each tooth 6 and hence, a lubricant such as grease can be supplied effectively to meshed portions of the teeth 6 by previously applying the lubricant in the grooves 8. Thus, it is possible to provide the smooth rotation of the gears 1 made of the resin and to prevent the wearing of the teeth 6. Therefore, if the gear 1 made of the resin according to the present embodiment is used in a drive mechanism for a rotary drum of a duplicator, the rotary drum can be rotated smoothly and with a good efficiency to provide an image of a high accuracy. Moreover, the gear 1 made of the resin according to the present embodiment is capable of transmitting a power accurately for a long period, because the wearing of the teeth 6 can be prevented. In addition, even if the gear 1 made of the resin according to the present embodiment is used in a power-transmitting mechanism in an automobile part or another precision machine other than the duplicator, the gear 1 can transmit a power smoothly and accurately for a long period.

II. Mold and Process for Producing Gear made of Resin

Figure 8:
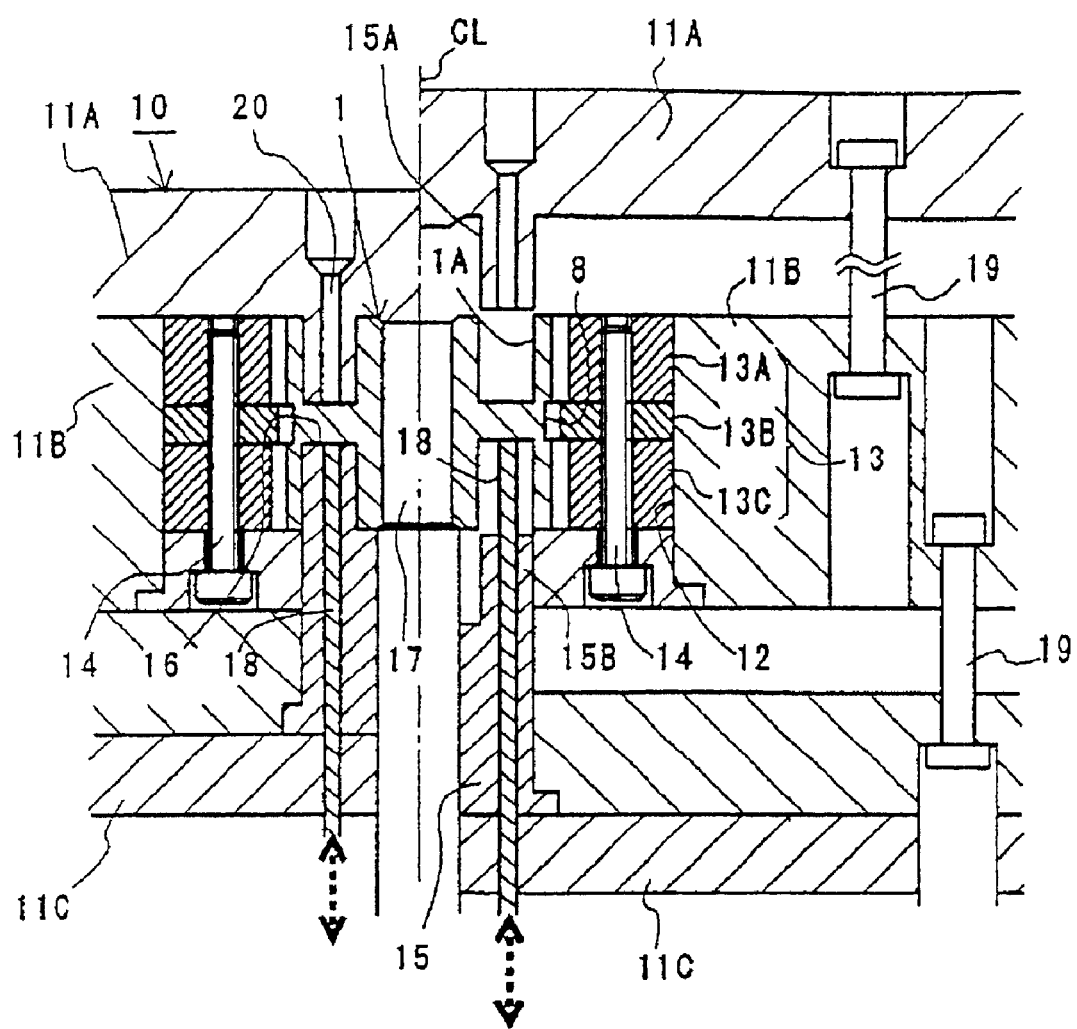
FIG. 8 is a sectional view of a mold for producing a gear of a resin according to the present invention.

FIG. 8 is a schematic view of a mold 10 for producing a gear 1 made of a resin according to the embodiment of the present invention. As shown in FIG. 8, the mold 10 includes a fist plate 11A, a second plate 11B and a third plate 11C. A left portion of FIG. 8 from a center line CL shows the mold 10 in a closed state, and a right portion of FIG. 8 shows relative positions of mold-constituting members with the mold 10 in an opened state. In the opened state of the mold, in usual, the first and second plates 11A and 11B are spaced sufficiently apart from each other, so that the operation for removing the gear 1 formed of the resin is not interfered with, but such state is not omitted in FIG. 8 for convenience for drawing the figure.

In FIG. 8, a split die 13 (13A, 13B and 13C) is accommodated in a recess 12 in the second plate 11B and fixed to the second plate 11B by a bolt 14. The split die 13 is comprised of a first die section 13A and a third die section 13C for forming the outside diameter of the gear 1 made of the resin, and a second die section 13B for forming the grooves 8 disposed between the first die section 13A and the third die section 13C.

Protrusions 15A and 15B are formed on the first and third plates 11A and 11C to protrude toward the second plate 11B for forming a wall-removed (or lightening) portion 1A. In FIG. 8, the protrusions 15A and 15B are shown as being formed integrally with the first plate 11A and separately from the third plate 11C, but means for forming the protrusion 15A and 15B in the corresponding plates 11A and 11C is not limited and can be designed and modified, as desired, in consideration of various conditions for processing and assembling of the mold-constituting members.

In FIG. 8, reference character 17 is a shaft hole-making pin which extends through the third plate 11C and protrudes at a central portion of a space (cavity 16) on the side of an inner periphery of the split die 13 attached to the second plate 11B. An ejecting pin 18 is accommodated in the third plate 11C for urging the gear 1 formed of the resin upwards as viewed in FIG. 8 during releasing of the gear 1 from the mold. A plurality of the ejecting pin 18 may be disposed, so that the gear 1 can be urged uniformly. In FIG. 8, reference character 19 is a hanger bolt for limiting the movement of the first, second and third plates 11A, 11B and 11C relative to one another.

On the other hand, a plurality of gates 20 are defined at substantially equal distances around the center line CL of the cavity 16 to open into the cavity 16. Consequently, a resinous material injected into the cavity 16 through the gates 20 equally flows into the cavity 16.

Figure 9:
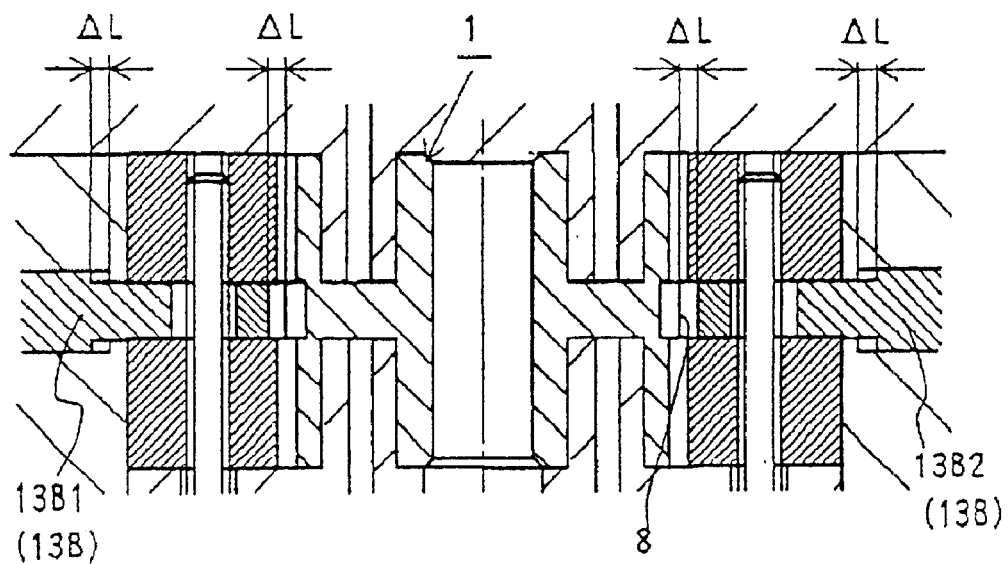
FIG. 9 is a sectional view showing an application example of a producing mold.
Figure 10:
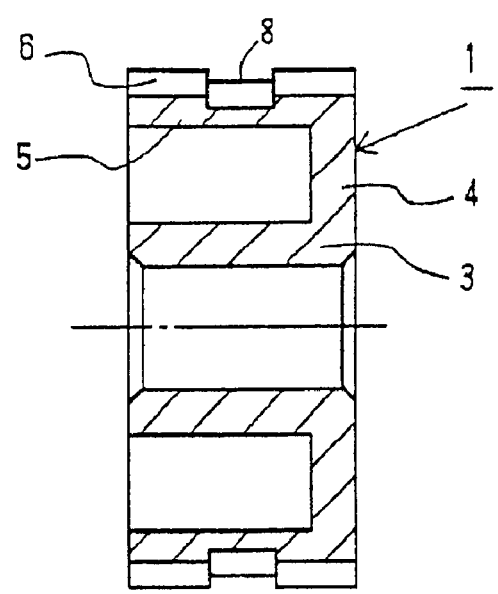
FIG. 10 is a vertical sectional view of a gear made of a resin according to a second application example of the present invention.

A difference between the inside diameter of the second die section 13B and the inside diameter of the first and third die sections 13A and 13C, namely, a depth of each of the grooves 8, is determined in consideration of an amount of gear 1 shrunk radially after being formed by the injection molding. More specifically, if the depth of the groove 8 is smaller than the amount of gear 1 shrunk radially after being formed by the injection molding, the gear 1 formed of the resin is released from the mold without being obstructed by the second die section 13B. On the other hand, if the depth of the groove 8 is larger than the amount of gear 1 shrunk radially after being formed by the injection molding, as shown in FIG. 9, it is required that the second die section 13B is divided into at least two portions 13B1 and 13B2, and when the formed gear 1 is released from the mold, the two portions 13B1 and 13B2 are moved through a predetermined amount (ΔL), so that an inside-diameter portion of the second die section 13B (13B1 and 13B2) is not caught on an outside diameter of the gear 1. If the depth of the groove 8 is smaller than the amount of gear 1 shrunk radially after being formed by the injection molding, it is not required that the second die section 13B is divided into at least two portions, and the two portions are moved radially outwards at the releasing of the gear 1 from the mold. Therefore, it is possible to simplify the structure of the mold to provide a reduction in cost of the mold, thereby providing a reduction in cost of the gear 1 made of the resin.

The gear 1 made of the resin according to the present embodiment is formed by the injection molding using the producing mold 10 as described above. More specifically, as shown in the left portion of FIG. 8, the cavity 16 corresponding to the shape of the gear 1 is defined by registering the first, second and third plates 11A, 11B and 11C with one another. Then, a resinous material is injected through the plurality of gates 20 into the cavity 16. After lapse of a predetermined time, the first, second and third plates 11A, 11B and 11C are parted in such a manner that the gear 1 formed of the resin by the injection molding is retained by the shaft hole-forming pin 17 and the split die 13. In this case, if the protrusions 15A and 15B formed on the first and third plates 11A and 11C are moved away from the wall-removed portion 1A of the gear 1 to define a space between the mold and the wall-removed portion 1A, prior to the releasing of the gear 1 from the mold by the pushing-out movement of the ejecting pin 18, the amount of gear 1 shrunk radially inwards can be increased, as compared with a case where such a space is not defined. After sufficient shrinking of the gear 1, the gear 1 formed of the resin is released from the cavity 16 in such a manner that it is pushed out by the ejecting pin 18. Thus, the gear 1 formed of the resin can be reliably released from a stationary die 11. In the case where the depth of the groove 8 in the gear 1 is larger than the amount of gear 1 shrunk radially, the die portions 13B1 and 13B2 resulting from the division of the second die section are slid, so that their inner portions are not brought into contact with the outer periphery of the gear 1 formed of the resin. Then, the gear 1 is released from the cavity 16 in such a manner that it is pushed out by the ejecting pin 18.

The structure of the mold 10 as described above is not limited to the shape corresponding to that of the gear 1 made of the resin according to the present embodiment, and may be of a shape similar to that of the gear 1, i.e., is applicable widely to the injection molding of a molded article which includes, in part, a sidewall portion (corresponding to the rim 5) having an undercut configuration (corresponding to the grooves 8) on one of sides (corresponding to the outer surfaces of the teeth 6), the other side of the sidewall portion being lightened or wall-removed (corresponding to the wall-removed portion 1A). The structure of the mold 10 is also applicable to another molded article having a shape in which, supposing that the boss 3 of the gear 1 according to the present embodiment is the sidewall portion, an undercut configuration is provided in an inner peripheral surface of the sidewall portion.

(First Application Example)

Figure 7:
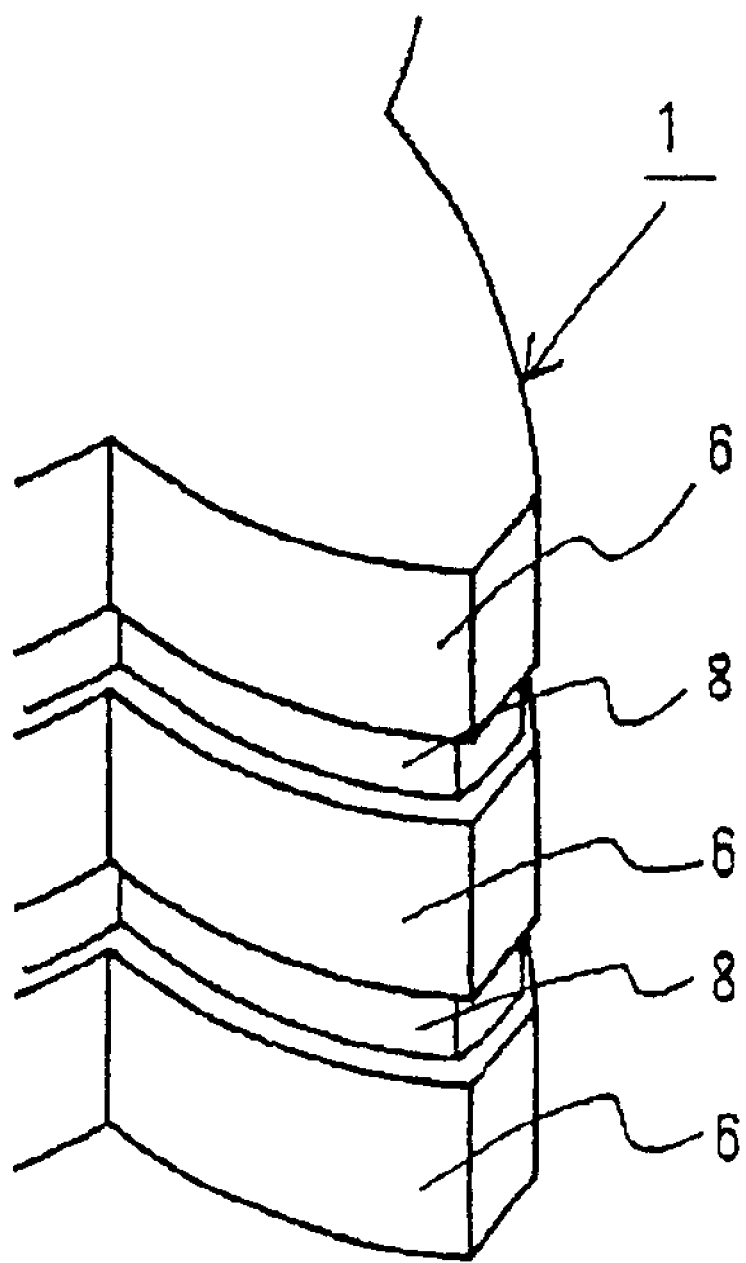
FIG. 7 is an enlarged perspective view of a portion of a gear made of a resin according to a first application example of the present invention.

In the above-described embodiment, the groove 8 is defined at one point along the outer surface of each tooth 6 of the gear 1 to bisecting the teeth 6 in the widthwise direction. The present invention is not limited to this embodiment, and as shown in FIG. 7, grooves may be defined at two points along the outer surface of each tooth 6 to trisect the teeth, i.e., to divide the teeth into three sections. Alternatively, grooves may be defined at more than two points along the outer surface of each tooth 6 in the widthwise direction.

(Second Application Example)

Figure 3:
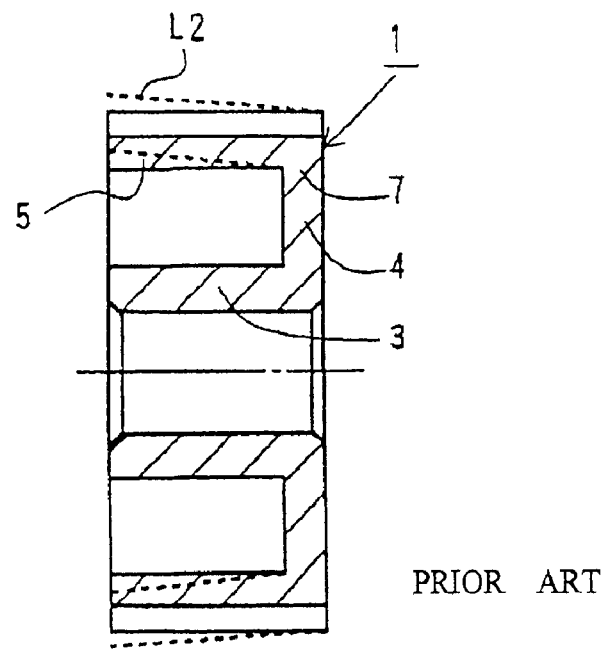
FIG. 3 is a perspective view of a second conventional gear of a resin.

In the gear 1 made of the resin according to the above-described embodiment, the web 4 is formed at the substantially axially central portion of the boss 3. However, the present invention is not limited to this embodiment, and the web 4 may be formed at an axial end of the boss 3, and the boss 3 and the rim 5 may be connected to each other by the web 4. One groove 8 may be defined along the outer surface of each tooth 6 at substantially widthwise central portions of the teeth 5 of the gear 1 made of the resin. If the gear 1 is formed in the above manner, it is possible to inhibit the deformation of the rim 5 of the gear 1, called a warpage, as shown in FIG. 3, thereby enhancing the tooth flank accuracy.

(Another Application Example)

The present invention is not limited to the shapes of the gears 1 according to the above-described embodiment and the application examples, and is applicable widely to an embodiment in which a rim 5 and a boss 3 are connected to each other by a web 4.

In the above-described embodiment and the application examples, at least one groove 8 is defined at the substantially widthwise central portion of the tooth 6, but the present invention is not limited to it, and the groove 8 may be defined at suitable location in consideration of the state of the tooth flank deformed, or may be defined at location where the lubricant can be supplied with a good effectiveness.

Figure 11:
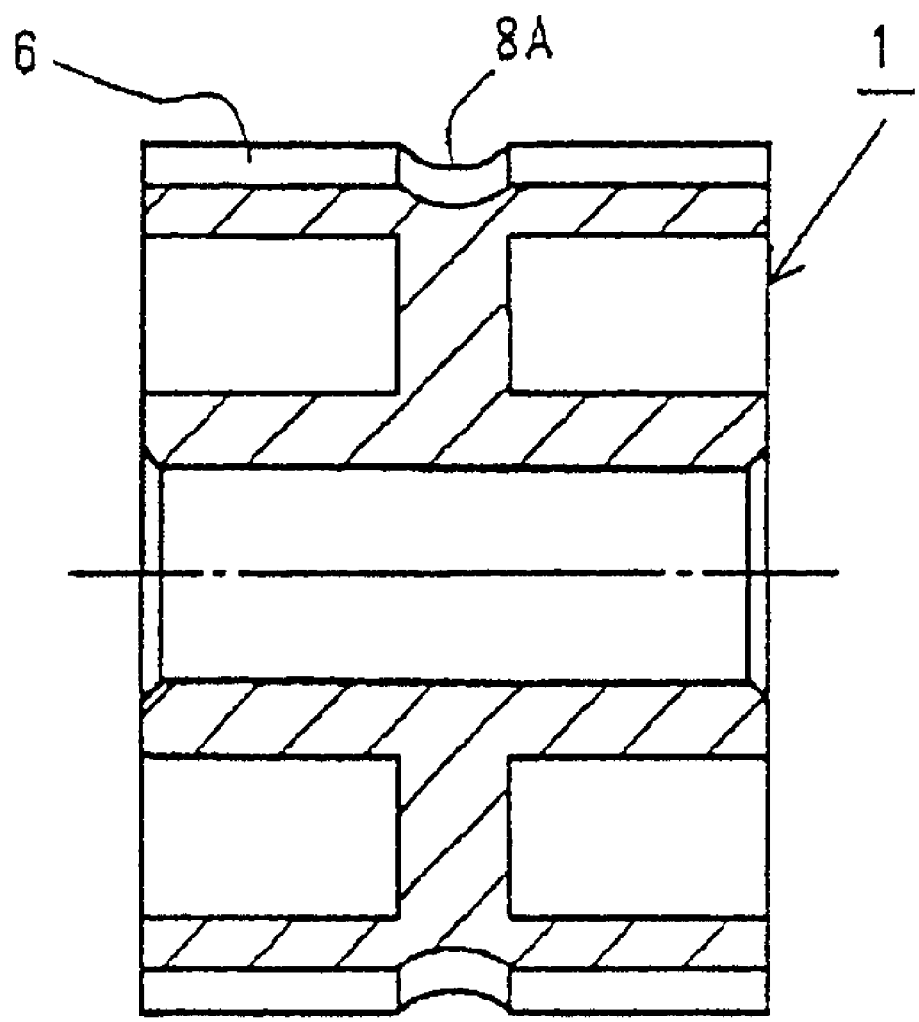
FIG. 11 is a vertical sectional view of a gear made of a resin according to another application example of the present invention.

The grooves 8 having the substantially rectangular sectional shape have been illustrated in the above-described embodiment, but the prevent invention is not limited to this embodiment, and arcuate grooves 8A may be defined along the outer surfaces of the teeth 6 of the gear 1 as shown in FIG. 11, or grooves may be formed into another shape such as a V-shape, a truncated conical shape and the like.

In the above-described embodiment and the application examples, the spur gear has been illustrated as the gear 1 made of the resin, but the present invention is not limited to the spur gear and is applicable widely to a helical gear, a screwed gear and the like.

Although the embodiments of the present invention have been described in detail, it will be understood that the present invention is not limited to the above-described embodiments, and various modifications in design may be made without departing from the spirit and scope of the invention defined in claims.

What is claimed is:

1. A single gear made of resin, comprising a substantially cylindrical rim having a plurality of teeth formed around an outer periphery thereof with each of said plurality of teeth having front and rear facing surfaces and a top, a boss formed about a rotational center of said rim, and a web connecting said boss and said rim to each other, wherein at least one groove is defined along an entire outer peripheral surface of each tooth of said teeth, said at least one groove being provided in said outer peripheral surface of each of said front and rear facing surfaces and said top of each of said plurality of teeth and in a valley provided between each successive ones of said plurality of teeth, said at least one groove defining at least a central gear portion and at least two outer gear portions wherein said central gear portion comprises central gear teeth smaller than outer gear teeth of said two outer gear portions.

2. The single gear of claim 1, wherein the groove is formed at substantially the center in the widthwise direction of the teeth.

3. The single gear of claim 1, wherein a plurality of said groves are provided along the outer surface of the teeth.

* * * * *